United States Patent
Bezbaruah et al.

(10) Patent No.: US 8,010,758 B1
(45) Date of Patent: Aug. 30, 2011

(54) SYSTEM AND METHOD FOR PERFORMING SECONDARY SITE SYNCHRONIZATION BASED ON A SINGLE CHANGE MAP

(75) Inventors: Angshuman Bezbaruah, Pune (IN); Anand Kekre, Pune (IN); Ankur Panchbudhe, Nagpur (IN)

(73) Assignee: Symantec Operating Corporation, Mountain View, CA (US)

( * ) Notice: Subject to any disclaimer, the term of this patent is extended or adjusted under 35 U.S.C. 154(b) by 423 days.

(21) Appl. No.: 11/134,108

(22) Filed: May 20, 2005

(51) Int. Cl.
*G06F 12/00* (2006.01)
*G06F 13/00* (2006.01)
*G06F 13/28* (2006.01)

(52) U.S. Cl. .................................................. 711/162

(58) Field of Classification Search .................. 711/162
See application file for complete search history.

(56) References Cited

U.S. PATENT DOCUMENTS

| | | | | |
|---|---|---|---|---|
| 5,263,154 A * | 11/1993 | Eastridge et al. | | 714/6 |
| 6,173,377 B1 * | 1/2001 | Yanai et al. | | 711/162 |
| 6,907,507 B1 * | 6/2005 | Kiselev et al. | | 711/162 |
| 6,978,354 B1 * | 12/2005 | Kekre et al. | | 711/162 |
| 7,194,487 B1 * | 3/2007 | Kekre et al. | | 707/201 |
| 7,386,755 B2 * | 6/2008 | Eguchi et al. | | 714/6 |
| 2002/0049776 A1 | 4/2002 | Aronoff et al. | | 707/200 |
| 2002/0144070 A1 * | 10/2002 | Watanabe et al. | | 711/165 |
| 2004/0215670 A1 | 10/2004 | Holenstein et al. | | 707/201 |

* cited by examiner

*Primary Examiner* — Kevin Ellis
*Assistant Examiner* — Gary W Cygiel
(74) *Attorney, Agent, or Firm* — Campbell Stephenson LLP

(57) ABSTRACT

Various methods and systems for synchronizing replicas using a single change map are disclosed. One method involves detecting a write to a first region of a volume, while synchronization of the volume with a replica volume is ongoing. If the first region is unsynchronized with respect to a corresponding region of the replica volume, replication of the write is inhibited. Otherwise, the write is replicated. Writes for which replication is inhibited will be applied to the replica volume at a later time as part of the ongoing synchronization.

20 Claims, 6 Drawing Sheets

SYSTEM AND METHOD FOR PERFORMING SECONDARY SITE SYNCHRONIZATION BASED ON A SINGLE CHANGE MAP

FIELD OF THE INVENTION

This invention relates to synchronizing copies of data and, more particularly, to synchronizing replicated data.

DESCRIPTION OF THE RELATED ART

Various information protection techniques are used to improve the availability of information. For example, replication techniques are used to maintain copies of information at separate locations. For example, information can be replicated on several different sites within a corporation's campus and/or on several different ones of the corporation's campuses. If the information is replicated at different sites, and if the failure of the systems storing the information at one site is unlikely to cause the failure of the corresponding systems at another site, replication can provide increased information reliability. Thus, if a disaster occurs at one site, an application that uses that information can be restarted using a replicated copy of the information at another site.

There are many situations in which replicated copies will not be synchronized with each other. For example, due to a failure in the network that couples two sites, replicas maintained at each site can become out-of-sync with respect to each other. In order to be able to resynchronize the replicas at a later time, the replica at the production site (i.e., the replica that is actively being used by an application) will track which portions of that replica have been modified subsequent to the point in time at which the replicas lost synchronization. Typically, such modifications are tracked in a bitmap or other structure. Once communication between the sites is re-established, the modifications identified in the bitmap can be applied to the replica at the non-production site, thus resynchronizing the replicas.

Often, synchronization of the replicas is performed iteratively, using at least two bitmaps. One bitmap tracks the changes that occur to a first copy relative to a second copy. When synchronization begins, the values of the regions identified by this first bitmap are copied from the first copy to the second copy. While those values are being copied, the second bitmap is used to track any new changes that occur to the first copy. After all of the values identified by the first bitmap have been copied to the second copy, the values identified by the second bitmap are copied from the first copy to the second copy. While this second set of values is being copied, the first bitmap can be cleared and reused to track additional changes to the first copy. This process repeats until no new writes have been identified in the bitmap that is currently tracking changes.

The iterative technique described above can take a long time to complete in certain situations. In particular, if a substantial amount of I/O occurs to the first copy during an iteration of the synchronization process, a large number of changes will be recorded in a bitmap. Those changes will need to be applied during the next iteration of the synchronization process. Since a significant amount of time is needed to copy the large number of changes, the likelihood that additional changes will be recorded during the next iteration is increased, which in turn increases the likelihood that a subsequent iteration will be needed.

Thus, under heavy workload conditions, a large number of iterations may be required to synchronize the two copies. Increases in the number of iterations increases the amount of time needed to complete the synchronization process. Accordingly, additional techniques for synchronizing replicas are desirable.

SUMMARY

Various embodiments of methods and systems for synchronizing replicas using a single change map are disclosed. In one embodiment, a method involves detecting a write to a first region of a volume, while synchronization of the volume with a replica volume is ongoing. If the first region is unsynchronized with respect to a corresponding region of the replica volume, replication of the write is inhibited. Otherwise, the write is replicated. Writes for which replication is inhibited will be applied to the replica volume at a later time as part of the ongoing synchronization. Program instructions implementing such a method can be stored in various computer readable media. Various systems and apparatus implementing the method can also be implemented.

Such a method can also involve identifying which regions of the volume have been processed by the ongoing synchronization of the volume with the replica volume. The identified regions are synchronized with respect to corresponding regions of the replica volume. These regions can be identified by maintaining a map (e.g., a bitmap) corresponding to the volume, where a first portion of the map corresponds to the first region of the volume, and identifying whether the first region is synchronized with the corresponding region of the replica volume, based on a value of the first portion of the map. Identifying which regions of the volume have been processed can involve maintaining a pointer to the map. The pointer is advanced past the first portion of the map, in response to the first region of the volume being processed by the ongoing synchronization of the volume with the replica volume.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
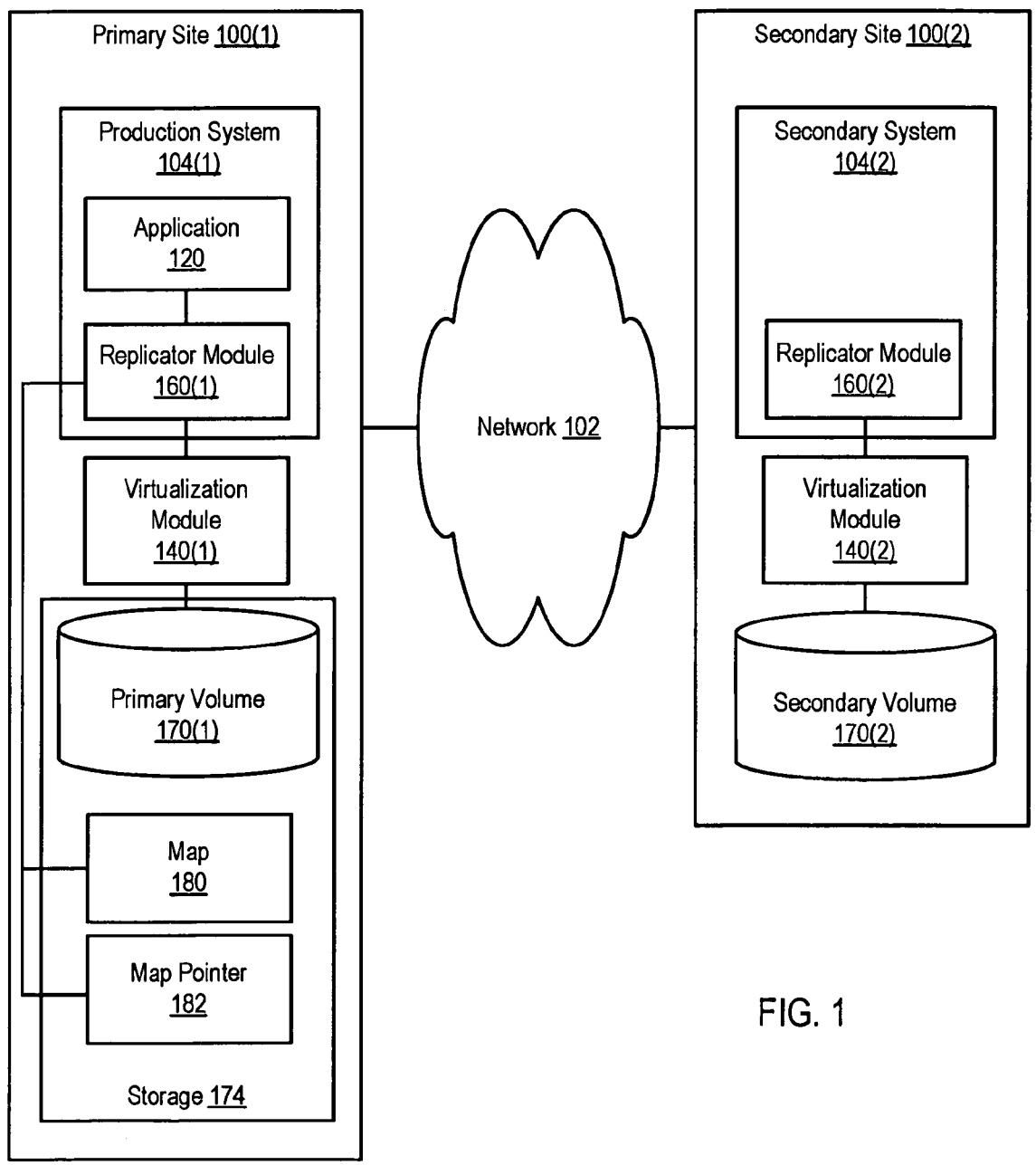
FIG. 1 is a block diagram of system for performing replication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system for performing replication from a primary volume to a secondary volume. The system illustrated in FIG. 1 can synchronize the primary volume with the secondary volume in a single iteration, using a single change map.

This system includes a primary site 100(1) and a secondary site 100(2). Collectively, sites 100(1) and 100(2) are referred to as sites 100. Primary site 100(1) and secondary site 100(2) are coupled by a network 102. Network 102 can include a WAN (Wide Area Network), such as the Internet, one or more LANs (Local Area Networks), and/or one or more SANs (Storage Area Networks).

Primary site 100(1) includes a production system 104(1), which implements the functionality of an application 120 and a replicator module 160(1). Primary site 100(1) also includes a virtualization module 140(1) and a primary volume 170(1). In some embodiments, virtualization module 140(1) is implemented in hardware and/or software on a network switch, network appliance, or storage device controller (e.g., an array controller). In alternative embodiments, virtualization module 140(1) is implemented in software that executes on production system 104(1). While FIG. 1 shows a situation in which replication module 160(1) is implemented in software that executes on production system 104(1), it is noted that replicator module 160(1) can alternatively be implemented in hardware and/or software on a host, network switch, network appliance, or storage device controller (e.g., an array controller). Additionally, in one embodiment, replicator module 160(1) is implemented as part of a backup component such as VERITAS NetBackup™, available from VERITAS Software Corp., of Mountain View, Calif.

While FIG. 1 illustrates a situation in which there is a single production system with respect to data in primary volume 170(1), it is noted that in alternative embodiments, multiple production systems can be present. For example, a distributed file system (such as the cluster file system (CFS) provided by VERITAS Storage Foundation™, available from VERITAS Software Corp., of Mountain View, Calif.) can be executed on each of several different nodes within a cluster, allowing each node to act as a production system.

Secondary site 100(2) includes secondary system 104(2), which implements the functionality of replicator module 160(2), as well as virtualization module 140(2) and a secondary volume 170(2). Like virtualization module 140(1), virtualization module 140(2) and/or replicator module 160(2) can be implemented in hardware and/or software on secondary system 104(2) or on another device (e.g., a network switch, appliance, or storage device controller).

A file system (not shown) can provide the interface via which users, such as application 120, access files on primary volume 170(1). Accordingly, the production system controls access to files on primary volume 170(1). It is noted that the production system could implement other mechanisms (e.g., databases, object-based storage, or the like) for abstracting data objects on volume 170(1) instead of and/or in addition to a file system. In general, the production system includes functionality that provides an abstraction of data to user applications and that maps abstract data objects such as files to locations on a storage device (e.g., primary volume 170(1)).

Each system 104(1) and 104(2) (collectively, systems 104) can include one or more computing devices configured to execute software implementing various applications (e.g., application 120, virtualization module 140(1) or 140(2), and/or replicator module 160(1) or 160(2)). In such embodiments, each system 104 can include a workstation, personal computer, server, PDA (Personal Digital Assistant), cell phone, storage network switch, storage device, storage array controller, or any other device configured to execute software implementing such applications. Alternatively, each system 104 can be implemented from one or more logic devices (e.g., PLDs, FPGAs, and the like) configured to perform the functions of such applications. Systems 104 can also be implemented using logic devices that are configured to perform some of the functions of the applications and that are also configured to execute software implementing other functions of the applications.

Application 120 is an example of an application that accesses files on primary volume 170(1). Application 120 can be any one of a variety of applications, such as a database application, a word processing application, and the like. It is noted that in some embodiments, application 120 is distributed in nature (e.g., like Oracle Parallel Server™ or Oracle RAC™, available from Oracle Corporation of Redwood Shores, Calif.). Such applications can access the same data (or files) from different production systems.

Virtualization modules 140(1) and 140(2) (collectively, virtualization modules 140) each create and manage one or more logical storage devices such as primary volume 170(1) and secondary volume 170(2). Each virtualization module 140 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Replicator modules 160(1) and 160(2) at the primary and secondary sites cooperate to maintain a replica (a consistent copy) of information stored on primary volume 170(1) on secondary volume 170(2). Consistency ensures that, even if the secondary volume is not identical to the primary volume (e.g., updates to the secondary volume may lag behind updates to the primary volume), the secondary volume always represents a state of the primary volume that actually existed (or could have existed without violating any write-ordering rules) at a previous point in time. For example, if an application performs a sequence of writes A, B, and C to the primary volume, consistency can be maintained by performing these writes to the secondary volume in the same sequence. At no point should the secondary volume reflect a state that never actually occurred on the primary volume, such as the state that would have occurred if write C was performed before write B.

Each data volume 170(1) and 170(2) can be implemented on one or more physical storage devices. For example, as shown, primary volume 170(1) is implemented on storage device 174. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device. It is noted that although a logical storage volume is shown in the illustrated example, other embodiments can use similar techniques to replicate data objects (such as files) that are stored directly on a physical storage device.

During normal operation, replicator modules 160(1) and 160(2) interact with each other (e.g., by sending requests and/or data to each other via network 102 and by respectively controlling activity that affects primary volume 170(1) and secondary volume 170(2)) in order to maintain secondary volume 170(2) as a replica of primary volume 170(1). This involves detecting operations that modify values stored in primary volume 170(1), and sending information identifying those operations across network 102 so that the operations can be applied to secondary volume 170(2). Thus, during replication, incremental changes that occur to primary volume 170(1) (e.g., due to applications such as application 120 modifying, creating, and/or deleting information on primary volume 170(1)) are replicated to secondary volume 170(2).

Replicator modules 160(1) and 160(2) can also interact with each other to synchronize secondary volume 170(2) with primary volume 170(1) in situations in which the volumes are initially out of sync. The volumes are out of sync whenever the non-working volume stores data that does not correspond to the current state of the working volume. In other words, the non-working volume should store a version of the working volume that is up-to-date, or nearly up-to-date (e.g., some small differences may exist due to the delays associated with transferring the most recent changes to the working volume across a network to the non-working volume). Situations in which the volumes can be out of sync include initialization, failback, and communications failures. For example, when secondary volume 170(2) is initialized as a replica of primary volume 170(1), primary volume 170(1) may already store valid application data. Accordingly, secondary volume 170 (2) will not be synchronized with primary volume 170(1).

Communications failures, such as a network failure, disrupt communication between replication sites. As a result of such a failure, the normal replication process is disrupted. Accordingly, applications may modify primary volume 170 (1), but those changes will not be replicated to secondary volume 170(2). Thus, while network communications are disrupted, the data volumes may be out of sync.

Failback occurs when primary volume 170(1) experiences a temporary failure. As a result of the failure, the application(s) using primary volume 170(1) can be failed over to secondary volume 170(2). When primary volume 170(1) is no longer failed, the application(s) can be failed-back to the primary volume 170(1). Between the times at which failover and failback occur, an application may modify secondary volume 170(2), and that modification will not be applied to the primary volume (since the primary volume is failed). Accordingly, when the primary volume resumes operation, the primary volume may be out of sync with the secondary volume. Before the application can failback to the primary volume, the primary volume must be synchronized with the secondary volume.

In order to be able to synchronize secondary volume 170(2) with primary volume 170(1), replicator module 160(1) maintains a map 180 and a map pointer 182. Map 180 and map pointer 182 can be stored on a non-volatile storage device such as storage device 174. Map 180 can be implemented as a bitmap or other structure that can identify whether each region (e.g., byte, block, or extent) of primary volume 170(1) is out of sync with a corresponding region of secondary volume 170(2). Map 180 stores information associated with each region in an ordered manner. For example, map 180 is a bitmap that includes one bit for each block of primary volume 170(2), the first bit will correspond to the first block, the second bit will correspond to the second block, and so on.

Map pointer 182 identifies a portion of map 180, either directly or indirectly. For example, map pointer 182 can be a pointer to an offset within map 180, directly identifying the portion of the map at that offset. Alternatively, map pointer 182 can be a pointer to an offset within primary volume 170(1). The portion of the primary volume at that offset is identified by a portion of the map, and thus the map pointer indirectly identifies that portion of the map. In some embodiments, map pointer 182 may not be stored in non-volatile storage (e.g., the map pointer can be implemented as an offset value that is maintained in memory).

Replicator module 160(2) can maintain a similar map and map pointer (not shown) for use in synchronizing primary volume 170(1) with secondary volume 170(2) (e.g., during failback situations). In such a situation, the map and map pointer maintained by replicator module 160(2) can be used according to the techniques described below with respect to the map and map pointer maintained by replicator module 160(1).

Replicator module 160(1) can use map 180 for purposes other than synchronization. For example, if replicator module 160(1) performs periodic replication, replicator 160(1) can use map 180 to track changes that occur to primary volume 170(1) during a replication period. As another example, replicator 180 can maintain map 180 as an overflow mechanism for recording modifications that occur to primary volume 170(1) if the recording capabilities of another change-tracking mechanism such as a log or cache are exceeded. For example, replicator module 160(1) can maintain cached copies of modified values that have been sent to secondary site 100(2) for application to secondary volume 170(2) until the secondary site has acknowledged those values. Similarly, replicator module 160(1) can maintain a log of changes that have occurred to primary volume 170(1) but that have not yet been applied to secondary volume 170(2). If the cache or log is in danger of overflowing, replicator module 160(1) can begin recording changes in map 180 (the changes recorded in map 180 can include the changes that are already recorded in the cache or log, in some embodiments).

Replicator module 160(1) uses map pointer 182 to keep track of which portions of primary volume 170(1) have already been synchronized with secondary volume 170(2). The map includes information about each portion of primary volume 170(1), arranged in some sort of order (e.g., by logical block address). When synchronization is performed by copying the values of the portions of primary volume 170(1) that are identified in map 180 to secondary volume 170(2), the copying is performed in the order of map 180 (e.g., if map 180 is ordered according to logical block addresses, copying is also performed in logical block address order). While replicator module 160(1) is copying those values, replicator module 160(1) can be described as performing a process of synchronizing primary volume 170(1) to secondary volume 170 (2).

Map pointer 182 is a pointer that can "point to," or identify, a portion of map 180 that corresponds to a particular portion of primary volume 170(1). For example, the value of map pointer 182 can be an offset into map 180. The portion of map 180 that is located at that offset is the portion of map 180 that is "pointed to" by map pointer 182. Replicator module 160(1) controls the value of map pointer 182 so that map pointer 182 identifies the portion of map 180 corresponding to the next portion of primary volume 170(1) that needs to be synchronized. Synchronization is complete when map pointer 182 has advanced to the end of map 180.

As an example, map 180 can store information for each block of primary volume 170(1), and this information can be stored in block address order. Primary volume 170(1) can include 20 blocks, blocks 0-19. Map 180 identifies blocks 0, 2, and 12 of primary volume 170(1) as being out-of-sync with secondary volume 170(2). Before synchronization begins, map pointer 182 points to the portion of map 180 that corresponds to block zero. Accordingly, map pointer 182 identifies block 0 as the next block of primary volume 170(1) that needs to be synchronized with secondary volume 170(2). When synchronization begins, replicator module 160(1) copies the value of block 0 from primary volume 170(1) to a corresponding block of secondary volume 170(2). Replicator module 160(1) then updates the value of map pointer 182, so that map pointer 182 identifies the next block of primary volume 170(1) that needs to be synchronized, which is block 2 (because block 1 is not identified as being out-of-sync in map 180, block 1 can be skipped). Similarly, after the value of block 2 has been copied to secondary volume 170(2), replicator module 160(1) can advance map pointer 182 to block 12.

While synchronization is being performed, application 120 can continue to access primary volume 170(1). Accordingly, portions of primary volume 170(1) may be modified while synchronization is being performed. Instead of halting replication during synchronization, replicator module 160(1) uses map pointer 182 to selectively determine whether to replicate a particular modification to primary volume 170(1) normally, or whether to let that modification be applied to secondary volume 170(2) as part of the synchronization process. In particular, if map pointer 182 has advanced past the portion of the map that identifies the portion of primary volume 170(1) that is being modified, replicator module 160(1) will allow that modification to be replicated normally. Thus, in the above example, if the map pointer currently identifies block 12 (out of blocks 0-19) as being the next block of the primary volume that needs to be synchronized, and if a modification to block 10 is detected (e.g., due to application 120 writing to a file), replicator module 160(1) will replicate the modification to block 10 normally.

If instead map pointer 182 has not advanced past the portion of the map that identifies the portion of primary volume 170(1) being modified, replicator module 160(1) can decide to let that modification be applied to secondary volume 170(2) as part of the synchronization process. For example, in one embodiment, replicator module 160(1) will apply any such modification to the secondary volume 170(2) as part of synchronization (as opposed to applying the modification to the secondary volume through normal replication). Accordingly, in such an embodiment, if map 180 does not already identify the portion of primary volume 170(1) that is being modified as being out-of-sync with respect to secondary volume 170(2), replicator module 160(1) will modify map 180 to indicate that the portion of primary volume 170(1) is out-of-sync. As a result of modifying map 180 to indicate that the portion of primary volume 170(1) is out-of-sync, the value of that portion of primary volume 170(1) will be copied to secondary volume during the synchronization process. For example, referring to the example involving the primary volume having 20 blocks, blocks 0-19, if the map pointer currently points to block 12 and a modification to block 14 is detected, the modification to block 14 will not be replicated normally. Instead, the map will be updated, if needed, to indicate that block 14 of the primary volume is out-of-sync with respect to the secondary volume. When the value of block 12 is copied to the secondary volume, the map pointer will advance to block 14. Accordingly, the modified value of block 14 will be applied to the secondary volume as part of the synchronization process, instead of being applied as part of the normal replication process.

In an alternative embodiment, if during synchronization map pointer 182 has not advanced past the portion of the map that identifies the portion of primary volume 170(1) that is being modified, replicator module 160(1) selectively determines whether to replicate that modification. If, prior to the modification, the map indicates that the portion of the primary volume being modified is out-of-sync with respect to the secondary volume, there is no need to replicate the modification, since the value of that portion of the primary volume is already scheduled to be copied to the secondary volume as part of the synchronization process. If instead, prior to the modification, the map indicates that the portion of the primary volume being modified is synchronized with respect to the secondary volume, then replicator module 160(1) can replicate the modification normally.

Using either of the techniques for handling modifications to portions of the volume that are beyond the map pointer, synchronization can be performed in a single iteration, using a single change map. Since modifications to the primary volume that occur during synchronization are either applied to the secondary volume as part of normal replication or applied to the secondary volume as part of the single iteration of the synchronization process, there is no need to maintain an additional change map. Furthermore, replication is not disrupted during the synchronization process.

While FIG. 1 illustrates a system configured to replicate files on a single data volume, other embodiments support replication of files from multiple data volumes. In such embodiments, the group of data volumes at the primary site 100(1) can be included in a primary replication volume group. Files on this primary replication volume group are then replicated to one or more volumes at the secondary site 100(2).

In some embodiments, there are multiple secondary volumes 170(2) (or replication volume groups) to which replicator module 160 replicates files in primary volume 170(1) (or a primary replication volume group). Identical replication operations are typically performed to all secondary volumes.

The example of FIG. 1 shows replicator modules 160(1) and 160(2) and virtualization modules 170(1) and 170(2) as independent modules. It is noted that in alternative embodiments, the functionality of these modules can be combined and/or implemented in other ways. For example, replicator module 160(1) and virtualization module 170(1) can be combined into a single module.

Figure 2A:
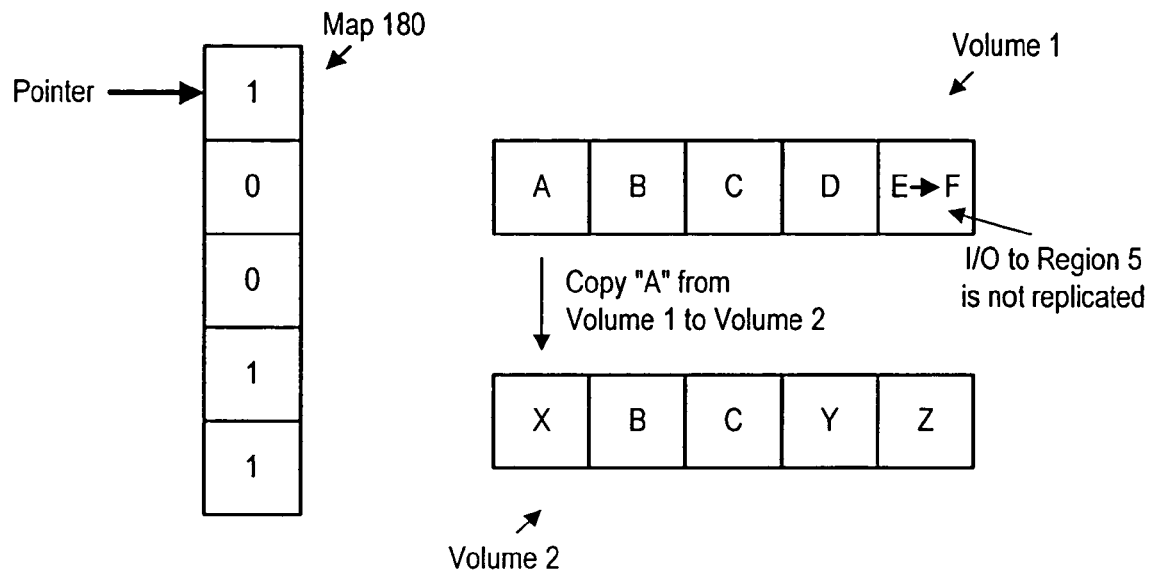
FIGS. 2A, 2B, and 2C provide an example of how two replicas can be synchronized using a single change map, according to one embodiment of the present invention.
Figure 2B:
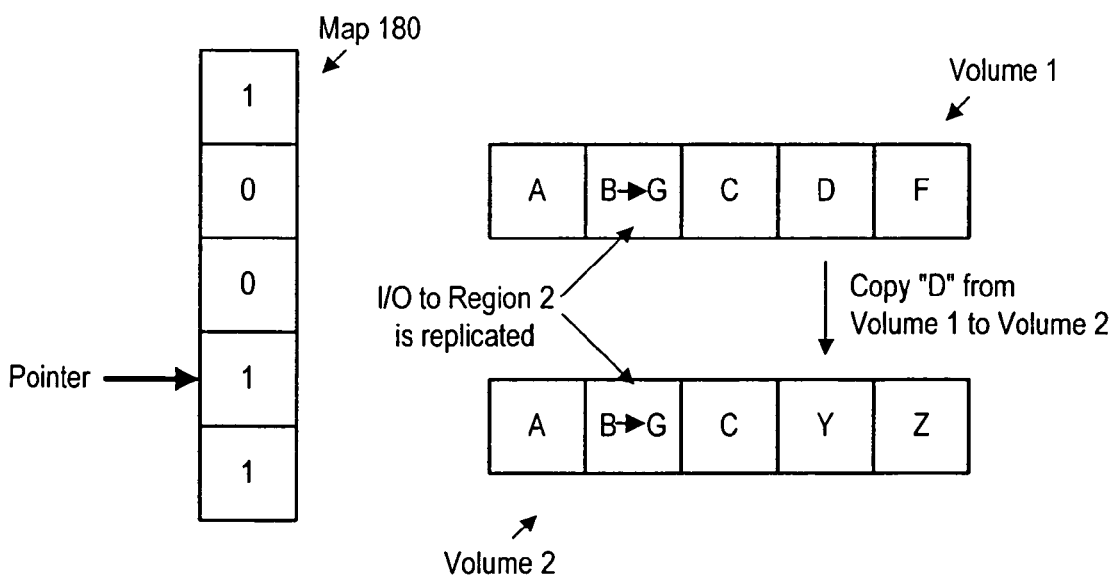
Figure 2C:
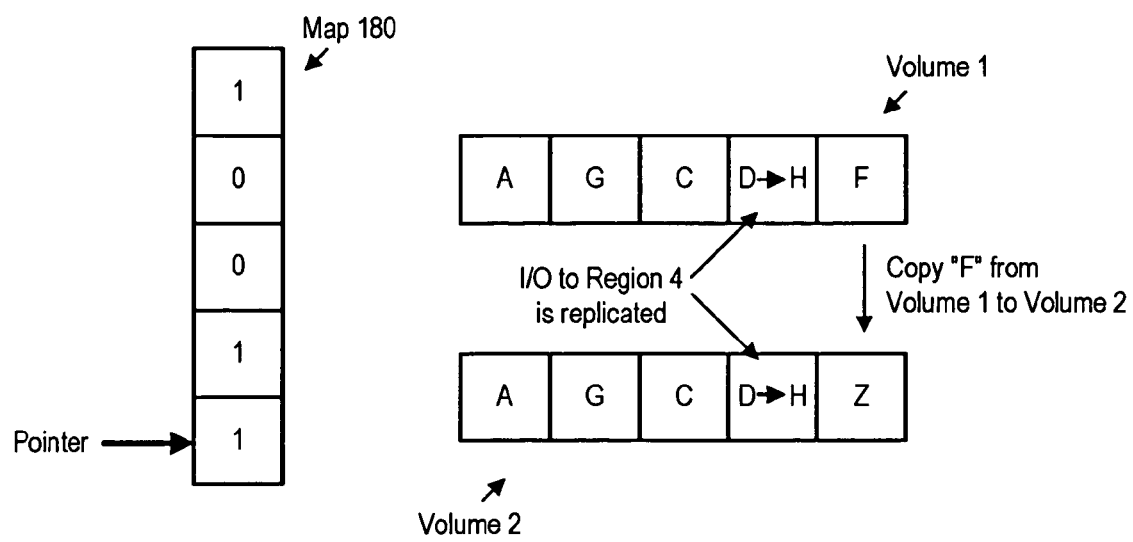

FIGS. 2A, 2B, and 2C show an example of a situation in which two replicas can be synchronized using a single change map. FIG. 2A shows a set of two replicas, Volume 1 and Volume 2, at the time at which synchronization begins. Each replica includes five regions. Initially, the values of the five regions of Volume 1 are A, B, C, D, and E respectively. The values of the five regions of Volume 2 are X, B, C, Y, and Z respectively. The first region of Volume 1 is replicated to the first region of Volume 2, the second region of Volume 2 is replicated to the second region of Volume 2, and so on.

A map 180 stores information identifying which regions of Volume 1 are out-of-sync with respect to corresponding regions of Volume 2. As shown, map 180 includes a bit corresponding to each of the five regions included in Volume 1. The uppermost bit in map 180 corresponds to the first (leftmost) region of Volume 1, the next uppermost bit in map 180 corresponds to the second region of Volume 1, and so on. In this example, a "set" bit (a bit having a value of logical 1) identifies a region that is out-of-sync with a replica, while a "clear" bit (a bit having a value of logical 0) identifies a region that is synchronized with a replica. As shown, regions 1, 4, and 5 are identified as being out-of-sync by map 180. A pointer identifies the next region to be synchronized, which is the first region of Volume 1.

When synchronization begins, the value of the first region of Volume 1 is copied to Volume 2, since that region is the region identified by the pointer. Accordingly, the value "A" is copied to Volume 2, and this value will replace value "X" of the first region of Volume 2. While this activity is taking place, I/O (input and/or output) activity modifies the fifth region of Volume 1, changing the value of that region from "E" to "F." Since the pointer has not advanced beyond the portion of map 180 that corresponds to the fifth region of Volume 1 and since map 180 already indicates that the fifth region of Volume 1 is out-of-sync, this modification is not immediately communicated to the secondary site as part of the normal replication process. Instead, this modification will be applied to Volume 2 at a later time, as part of the synchronization process.

FIG. 2B illustrates the same system as FIG. 2A, after the first region of Volume 1 has been synchronized with the first region of Volume 2. Since those two regions are now synchronized, the pointer has advanced to the next region of Volume 1 that is identified as being out-of-sync, which is the fourth region. Since the second and third regions are not identified as being out-of-sync in map 180, there is no need to copy the values of these regions as part of the synchronization process. In response, the synchronization process begins copying the value "D" of the fourth region of Volume 1 to the secondary site, which will change the value of the fourth region of Volume 2 from "Y" to "D."

While the value of the fourth region of Volume 1 is being copied to the secondary site, I/O activity modifies the second region of Volume 1, changing the value from "B" to "G." Since the pointer has already advanced past the portion of map 180 that corresponds to the second region, this modification is immediately replicated to Volume 2, as part of the normal replication process.

FIG. 2C illustrates the same system as FIGS. 2A and 2B, after the fourth region of Volume 1 has been synchronized with the fourth region of Volume 2. Now, the first four regions of the two replicas are synchronized with each other. The pointer has advanced to identify the fifth region of Volume 1 as the next region to be copied as part of the synchronization process. Accordingly, the value "F" of the fifth region of Volume 1 is coped to Volume 2, which will change value "Z" to value "F" on Volume 2. While the value of the fifth region is being copied, I/O activity modifies the fourth region of Volume 1, changing value "D" to value "H." Since the pointer has advanced beyond the fourth region, this modification is replicated immediately.

As shown by FIGS. 2A, 2B, and 2C, the synchronization process completes after a single pass through a single map. There is no need to iteratively cycle through a pair of maps. Once the synchronization process has copied the values of all of the regions identified as being out-of-sync by map 180, map 180 can be discarded or reused.

Figure 3:
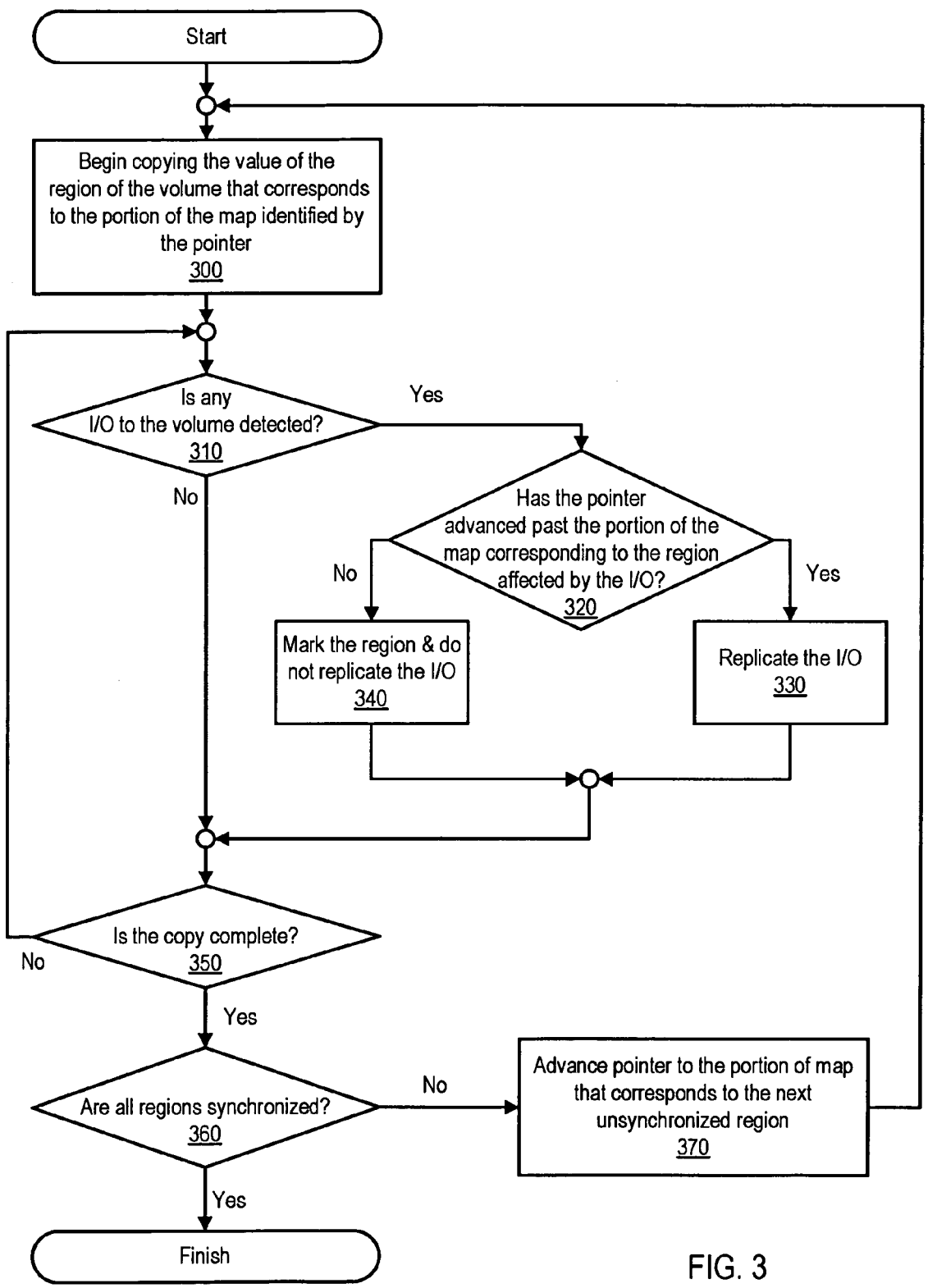
FIG. 3 is a flowchart of a method of synchronizing replicas, according to one embodiment of the present invention.

FIG. 3 is a flowchart of a method of synchronizing volumes that are being used as replicas, according to one embodiment of the present invention. The method involves using a map (e.g., a bitmap) that indicates which regions of one volume are out-of-sync with corresponding regions of the other volume.

The method of FIG. 3 begins at 300, when the value of the region of the volume that corresponds to the portion of the map identified by the pointer is copied to the other volume. While the region is being copied, I/O to the volume may be detected, as determined at 310.

If I/O to the volume is detected at 310, a determination is made as to whether the pointer has advanced beyond the portion of the map that corresponds to the region that is affected by the I/O, as shown at 320. If the pointer has moved beyond the region that is being affected by the I/O, the I/O is replicated normally, as part of the normal replication process, as shown at 330. Accordingly, information identifying the I/O (or the modifications caused by the I/O) can be transferred to the secondary site.

If the pointer has not advanced beyond the region that is being affected by the I/O, the portion of the map that corresponds to that region is marked as being out-of-sync (e.g., by updating the value of that portion of the map), and the I/O is not replicated as part of the normal replication process, as shown at 340. If the portion of the map already indicates that the region is out-of-sync, no changes need to be made to the map.

If the copying activity initiated at 300 is complete, as determined at 350, a determination can be made as to whether all of the regions of the volume have been synchronized with the other volume. If so, as determined at 360, the synchronization process is complete. Otherwise, the pointer is advanced to identify the next out-of-sync region of the volume, as shown at 370. This function can be performed by identifying the next portion of the map that identifies an out-of-sync region of the volume, and then updating the value of the pointer so that the pointer identifies that portion of the map.

Functions 300-370 can be repeated until all of the out-of-sync regions of the volume (as identified by the map) have been copied to the other volume. It is noted that in some embodiments, the functions illustrated in FIG. 3 can be combined and/or reordered. Additionally, in other embodiments, different functions can be performed instead of and/or in addition to those functions illustrated in FIG. 3.

Figure 4:
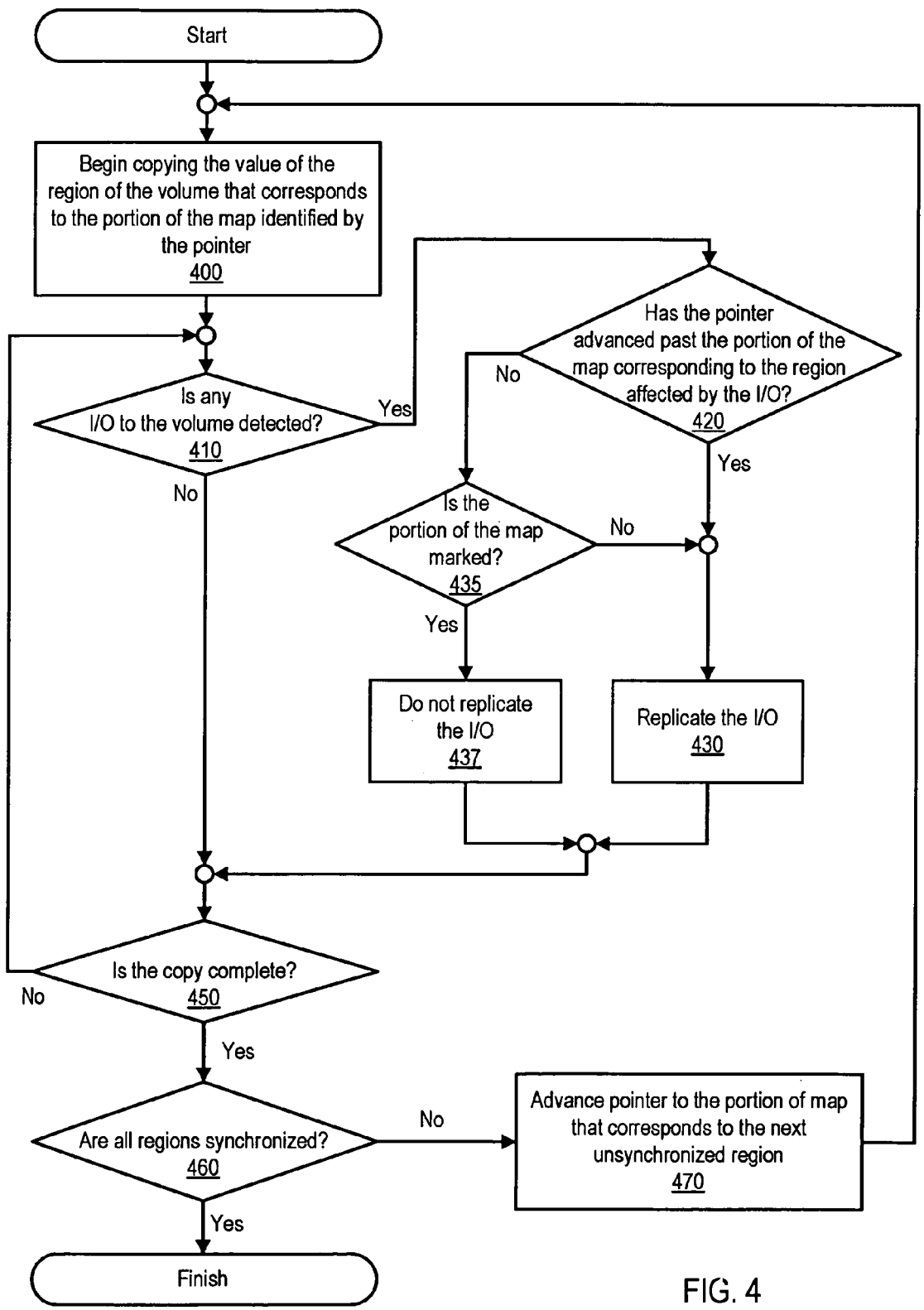
FIG. 4 is a flowchart of another method of synchronizing replicas, according to one embodiment of the present invention.

FIG. 4 is a flowchart of another embodiment of a method of synchronizing replicas. This method is similar to the method of FIG. 3, and similar functions have been given similar numbers (e.g., function 400 of FIG. 4 is similar to function 300 of FIG. 3, function 450 is similar to function 350 of FIG. 3, and so on).

Thus, like the method of FIG. 3, the method of FIG. 4 involves initiating activity to copy the value of the region of the volume that is currently indicated by the pointer, as shown at 400. While the copy activity is being performed, I/O activity to the volume may be detected, as determined at 410. If I/O activity is detected, a determination is made as to whether the pointer has advanced beyond the portion of the map that corresponds to the region that is affected by the I/O activity, as shown at 420. If the pointer has advanced beyond that region of the volume, the I/O activity is replicated normally, as indicated at 430.

If the pointer has not advanced past the region of the volume that is affected by the I/O activity, a determination is made as to whether the affected region of the volume is already marked as being out-of-sync with respect to the replica in the map. If the portion of the map that corresponds to the affected region indicates that the region is synchronized with a corresponding region of the replica, then the I/O activity is replicated normally, as indicated at 435 and 430. If the portion of the map instead indicates that the affected region is out-of-sync, then the I/O activity is not replicated normally, as shown at 435 and 437.

The inclusion of functions 435 and 437 distinguishes the method of FIG. 4 from the method of FIG. 3. In the method of FIG. 3, no I/O activity that affects a region of the volume that is beyond the pointer is replicated normally. In contrast, in the method of FIG. 4, I/O activity that occurs during synchronization is not replicated normally only if the I/O activity affects an out-of-sync region of the volume that lies beyond the current position of the pointer.

Once the copying activity initiated at 400 has completed, a determination as to whether all of the regions of the volume are synchronized can be made, as shown at 450 and 460. All of the regions of the volume are synchronized if the pointer has advanced beyond all of the regions that are identified as being out-of-sync. If some regions of the volume still need to be synchronized, the pointer can be advanced to the next portion of the map that identifies an unsynchronized region, as shown at 470. Functions 400-470 can be repeated until the volume is synchronized with the other volume that is being used as a replica.

It is noted that several alternative embodiments can be implemented. For example, in some embodiments, instead of first determining whether to replicate I/O activity normally based on the position of a map pointer relative to the region being affected by the I/O activity, such a determination can initially be made based on whether the map currently identifies the affected region as being out-of-sync. If the map indicates that the affected region is synchronized with respect to the replica, the I/O activity can be replicated normally. If instead the map indicates that the affected region is out-of-sync, the position of the pointer relative to the affected region can then be used to determine whether to replicate the I/O activity normally. Thus, if the pointer has advanced beyond the out-of-sync region, the I/O activity is replicated normally; otherwise, the I/O activity will not be replicated normally (instead, the modified version of the affected region will be copied to the replica at a later time, as part of the synchronization process).

Figure 5:
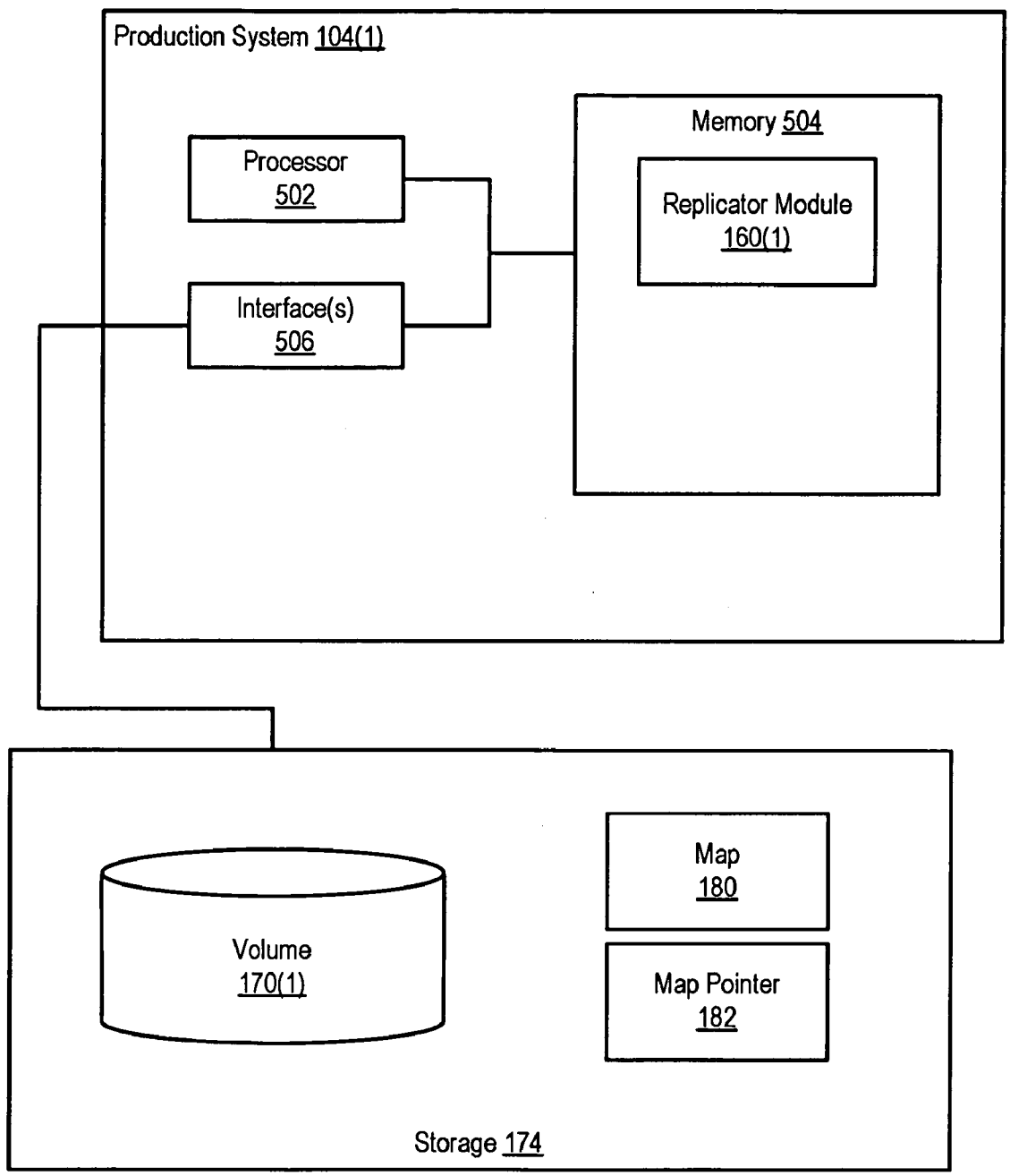
FIG. 5 shows a block diagram of a computing device, illustrating how a replicator module that uses a single change map to perform synchronization can be implemented in software.

FIG. 5 illustrates a block diagram of a computing device that is operating as a production system 104(1) (e.g., the production system shown in FIG. 1). As illustrated, production system 104(1) includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Production system 104(1) also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices. Interface 506 can also include an interface to a network, for use in communicating with other nodes and/or for use in communicating with networked storage devices.

In this example, program instructions executable to implement an instance of a replicator module 160(1) are stored in memory 504. Replicator module 160(1) can implement techniques to synchronize replicas, using a single change map, without disrupting ongoing replication. The program instructions and data implementing the replicator module can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order to be executed by processor 502, the instructions and data implementing the replicator module are loaded into memory 504 from the other computer readable medium. The instructions and/or data implementing the replicator module can also be transferred to production system 104(1) for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing a replicator module are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a write to a first region of a volume, while synchronization of the volume with a replica volume is ongoing;
   modifying the first region while the synchronization is ongoing;
   detecting whether the first region of the volume is synchronized with respect to a corresponding region of the replica volume, wherein the detecting comprises detecting whether a pointer has advanced beyond a portion of a map corresponding to the first region of the volume, wherein the pointer identifies a next portion of the map that corresponds to a next region of the volume that needs to be synchronized with the replica volume during the ongoing synchronization;
   updating the map to indicate that the first region is unsynchronized with respect to the corresponding region of the replica volume, if the pointer has not advanced beyond the portion of the map, wherein
      the updating indicates that the first region will be synchronized at a first point in time during the ongoing synchronization, and
      the first point in time occurs when the pointer advances to the portion of the map corresponding to the first region;
   inhibiting replication of the write to the replica volume, if the pointer has not advanced beyond the portion of the map; and
   replicating the write, if the pointer has advanced beyond the portion of the map.

2. The method of claim 1, further comprising:
   identifying which regions of the volume have been processed by the ongoing synchronization of the volume with the replica volume, wherein
      the regions of the volume that have been processed are synchronized with respect to corresponding regions of the replica volume.

3. The method of claim 2, wherein the identifying which regions of the volume have been processed comprises:
   maintaining the pointer, wherein the maintaining the pointer comprises:
      advancing the pointer past the portion of the map, in response to the first region being processed during the ongoing synchronization of the volume with the replica volume.

4. The method of claim 3, wherein the map is a bitmap.

5. The method of claim 1, wherein the pointer indirectly identifies the next portion of the map by identifying a volume offset within the volume.

6. A system comprising:
means for detecting a write to a first region of a volume, while synchronization of the volume with a replica volume is ongoing;
means for modifying the first region while the synchronization is ongoing;
means for detecting whether the first region of the volume is synchronized with respect to a corresponding region of the replica volume, wherein detecting whether the first region is synchronized comprises detecting whether a pointer has advanced beyond a portion of a map corresponding to the first region of the volume, wherein the pointer identifies a next portion of the map that corresponds to a next region of the volume that needs to be synchronized with the replica volume during the ongoing synchronization;
means for updating the map to indicate that the first region is unsynchronized with respect to the corresponding region of the replica volume, if the pointer has not advanced beyond the portion of the map, wherein
the updating indicates that the first region will be synchronized at a first point in time during the ongoing synchronization, and
the first point in time occurs when the pointer advances to the portion of the map corresponding to the first region;
means for inhibiting replication of the write to the replica volume, if the pointer has not advanced beyond the portion of the map;
means for replicating the write, if the pointer has advanced beyond the portion of the map; and
means for storing information identifying whether the first region is currently synchronized with respect to the corresponding region of the replica volume.

7. The system of claim 6, further comprising:
means for identifying which regions of the volume have been processed by the ongoing synchronization of the volume with the replica volume, wherein
the regions of the volume that have been processed are synchronized with respect to corresponding regions of the replica volume.

8. The system of claim 7, wherein the identifying which regions of the volume have been processed comprises:
means for maintaining the pointer, wherein the maintaining the pointer comprises:
advancing the pointer past the portion of the map, in response to the first region being processed during the ongoing process of synchronizing the volume with the replica volume.

9. The system of claim 8, wherein the map is a bitmap.

10. The system of claim 6, wherein the pointer indirectly identifies the next portion of the map by identifying a volume offset within the volume.

11. A non-transitory computer readable storage medium comprising program instructions executable to:
detect a write to a first region of a volume, while synchronization of the volume with a replica volume is ongoing;
modify the first region while the synchronization is ongoing;
detect whether the first region of the volume is synchronized with respect to a corresponding region of the replica volume, wherein detecting whether the first region is synchronized comprises detecting whether a pointer has advanced beyond a portion of a map corresponding to the first region of the volume, wherein the pointer identifies a next portion of the map that corresponds to a next region of the volume that needs to be synchronized with the replica volume during the ongoing synchronization;
update the map to indicate that the first region is unsynchronized with respect to the corresponding region of the replica volume, if the pointer has not advanced beyond the portion of the map, wherein
updating the map indicates that the first region will be synchronized at a first point in time during the ongoing synchronization, and
the first point in time occurs when the pointer advances to the portion of the map corresponding to the first region;
inhibit replication of the write to the replica volume, if the pointer has not advanced beyond the portion of the map; and
replicate the write, if the pointer has advanced beyond the portion of the map.

12. The non-transitory computer readable storage medium of claim 11, wherein the program instructions are further executable to:
identify which regions of the volume have been processed by the ongoing synchronization of the volume with the replica volume, wherein
the regions of the volume that have been processed are synchronized with respect to corresponding regions of the replica volume.

13. The non-transitory computer readable storage medium of claim 12, wherein identifying which regions of the volume have been processed comprises:
maintaining the pointer, wherein the maintaining the pointer comprises:
advancing the pointer past the portion of the map, in response to the first region being processed during the ongoing process of synchronizing the volume with the replica volume.

14. The non-transitory computer readable storage medium of claim 13, wherein the map is a bitmap.

15. The non-transitory computer readable storage medium of claim 11, wherein the pointer indirectly identifies the next portion of the map by identifying a volume offset within the volume.

16. A system comprising:
a processor; and
a memory coupled to the processor, the memory storing program instructions executable by the processor to:
detect a write to a first region of a volume, while synchronization of the volume with a replica volume is ongoing;
modify the first region while the synchronization is ongoing;
detect whether the first region of the volume is synchronized with respect to a corresponding region of the replica volume, wherein detection of whether the first region is synchronized comprises detection of a pointer has advanced beyond a portion of a map corresponding to the first region of the volume, wherein the pointer identifies a next portion of the map that corresponds to a next region of the volume that needs to be synchronized with the replica volume during the ongoing synchronization;
update the map to indicate that the first region is unsynchronized with respect to the corresponding region of the replica volume, if the pointer has not advanced beyond the portion of the map, wherein
updating the map indicates that the first region will be synchronized at a first point in time during the ongoing synchronization, and the first point in time occurs when the pointer advances to the portion of the map corresponding to the first region;

inhibit replication of the write to the replica volume, if the pointer has not advanced beyond the portion of the map; and replicate the write, if the pointer has advanced beyond the portion of the map.

17. The system of claim 16, wherein the program instructions are further executable by the processor to:

identify which regions of the volume have been processed by the ongoing synchronization of the volume with the replica volume, wherein the regions of the volume that have been processed are synchronized with respect to corresponding regions of the replica volume.

18. The system of claim 16, wherein the pointer indirectly identifies the next portion of the map by identifying a volume offset within the volume.

19. A system comprising:

a volume;

a replica volume; and a replicator module coupled to the volume and the replica volume, wherein the replicator module is configured to:

detect a write to a first region of the volume, while synchronization of the volume with the replica volume is ongoing;

modify the first region while the synchronization is ongoing;

detect whether the first region of the volume is synchronized with respect to a corresponding region of the replica volume, wherein detection of whether the first region is synchronized comprises detection of a pointer has advanced beyond a portion of a map corresponding to the first region of the volume, wherein the pointer identifies a next portion of the map that corresponds to a next region of the volume that needs to be synchronized with the replica volume during the ongoing synchronization;

update the map to indicate that the first region is unsynchronized with respect to the corresponding region of the replica volume, if the pointer has not advanced beyond the portion of the map, wherein updating the map indicates that the first region will be synchronized at a first point in time during the ongoing synchronization, and the first point in time occurs when the pointer advances to the portion of the map corresponding to the first region;

inhibit replication of the write to the replica volume, if the pointer has not advanced beyond the portion of the map; and replicate the write, if the pointer has advanced beyond the portion of the map.

20. The system of claim 19, wherein the replicator module is configured to maintain the map and the pointer, wherein the map and the pointer identify which regions of the volume have been processed by the ongoing synchronization of the volume with the replica volume, and the regions of the volume that have been processed are synchronized with respect to corresponding regions of the replica volume.

* * * * *